United States Patent
Mendel et al.

(10) Patent No.: US 12,047,435 B1
(45) Date of Patent: Jul. 23, 2024

(54) MANAGING SOFTWARE CATALOGS IN HYBRID AND MULTI-CLOUD ENVIRONMENTS

(71) Applicant: International Business Machines Corporation, Armonk, NY (US)

(72) Inventors: Gili Mendel, Cary, NC (US); Brian William Svihovec, Cary, NC (US); James William Dubee, Durham, NC (US); Jon Woodlief, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/219,202

(22) Filed: Jul. 7, 2023

(51) Int. Cl.
*H04L 67/06* (2022.01)
*H04L 67/1097* (2022.01)

(52) U.S. Cl.
CPC .......... *H04L 67/06* (2013.01); *H04L 67/1097* (2013.01)

(58) Field of Classification Search
CPC .......................... H04L 67/1097; H04L 67/67
See application file for complete search history.

(56) References Cited

U.S. PATENT DOCUMENTS

| | | | |
|---|---|---|---|
| 6,108,420 | A | 8/2000 | Larose et al. |
| 7,562,358 | B2 | 7/2009 | Bennett et al. |
| 7,743,373 | B2 | 6/2010 | Avram et al. |
| 8,521,865 | B2 | 8/2013 | D'Alo et al. |
| 11,086,618 | B2 | 8/2021 | Di Litta et al. |
| 11,328,344 | B2 | 5/2022 | Sehgal et al. |
| 2006/0184932 | A1 | 8/2006 | Burnley et al. |
| 2012/0032945 | A1* | 2/2012 | Dare .................. G06F 3/0488 345/418 |
| 2013/0054801 | A1* | 2/2013 | Belchee ............. G06F 21/105 709/225 |
| 2013/0305239 | A1 | 11/2013 | Traut et al. |
| 2018/0131721 | A1* | 5/2018 | Jones .................... G06F 21/604 |

OTHER PUBLICATIONS

Google, Manage your child's Google Play apps, 2023, https://support.google.com/families/answer/7103028?hl=en#zippy=%2Cselect-your-always-allowed-apps.
Progress Chef, Edge Application Delivery Automation, 2023, https://www.chef.io/products/chef-app-delivery.
Catsy, Centralized Product Information Management, 2023, https://catsy.com/centralize.
Microsoft, Client Management, 2023, https://docs.microsoft.com/en-us/windows/client-management/.

* cited by examiner

*Primary Examiner* — Shean Tokuta
(74) *Attorney, Agent, or Firm* — Garg Law Firm, PLLC; Rakesh Garg; James Olsen

(57) ABSTRACT

An embodiment includes defining a private software catalog in a private cloud where the private software catalog includes a first set of software. The embodiment also includes associating the private software catalog with a target system. The embodiment also includes transferring the first set of software in the private software catalog to a target catalog corresponding to a target system. The embodiment also includes removing a second set of software from the target system where the second set of software is not defined in the private software catalog for the target catalog corresponding to the target system. Other embodiments of this aspect include corresponding computer systems, apparatus, and computer programs recorded on one or more computer storage devices, each configured to perform the actions of the embodiment.

19 Claims, 5 Drawing Sheets

MANAGING SOFTWARE CATALOGS IN HYBRID AND MULTI-CLOUD ENVIRONMENTS

BACKGROUND

The present invention relates generally to systems administration. More particularly, the present invention relates to a method, system, and computer program for managing software catalogs in hybrid and multi-cloud environments.

Hybrid cloud environments can contain a wide variety of systems to run different pieces of software. A hybrid cloud is a mixed computing environment where applications are run using a combination of computing, storage, and services in different environments such as public clouds and private clouds. The cloud can also distribute traffic to data centers positioned closer to end users usually in major cities. Organizations have to regulate the software which can be deployed across those systems to meet compliance requirements. Most systems in a hybrid cloud have own means of installing software. Account administrators must enact different means of controlling software installations across each target system.

SUMMARY

The illustrative embodiments provide for managing software catalogs in hybrid and multi-cloud environments. An embodiment includes defining a private software catalog in a private cloud where the private software catalog includes a first set of software. The embodiment also includes associating the private software catalog with a target system. The embodiment also includes transferring the first set of software in the private software catalog to a target catalog corresponding to a target system. The embodiment also includes removing a second set of software from the target system where the second set of software is not defined in the private software catalog for the target catalog corresponding to the target system. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
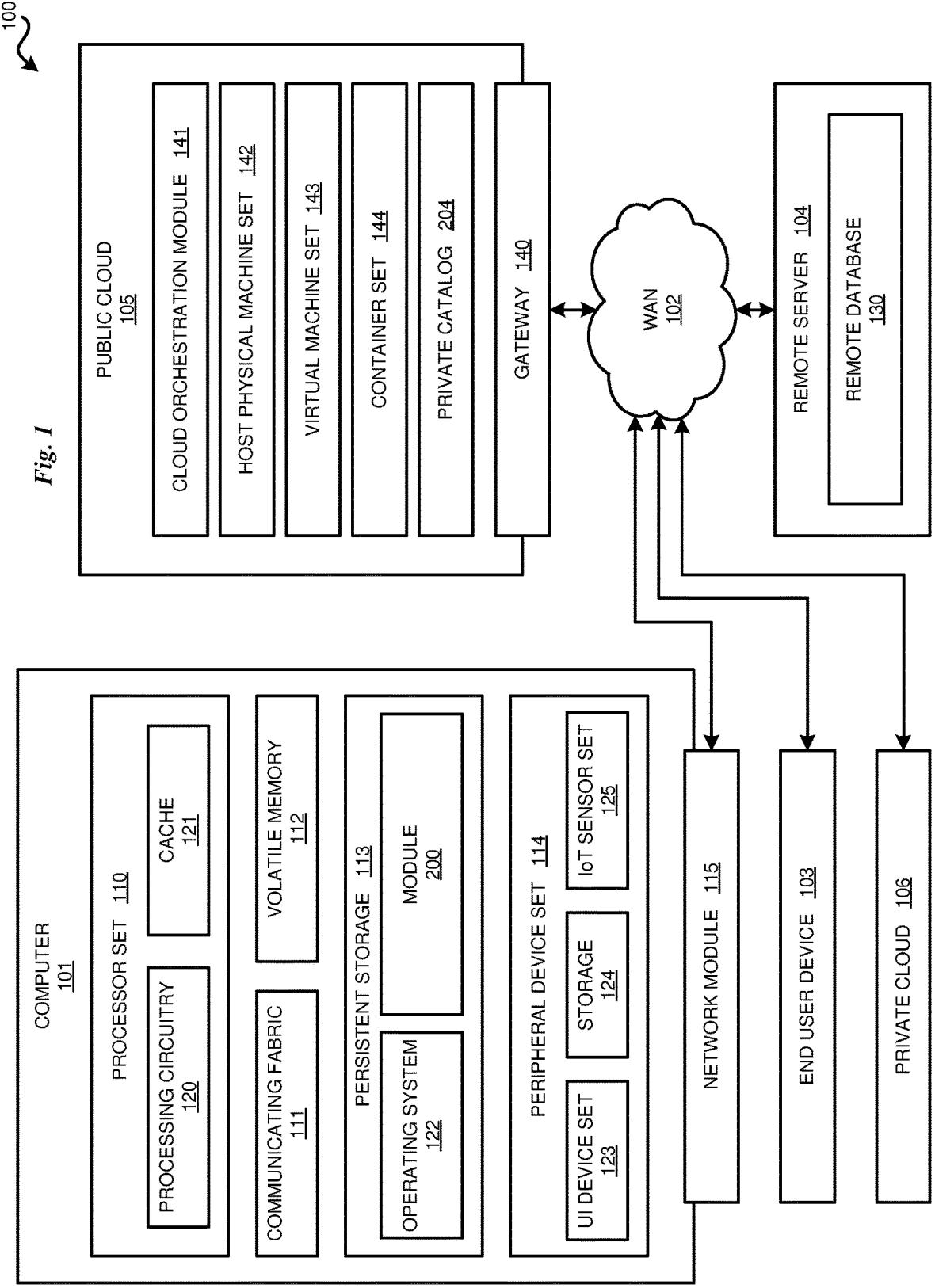
FIG. 1 depicts a block diagram of a computing environment in accordance with an illustrative embodiment.

Hybrid cloud environments can contain a wide variety of systems to run different pieces of software. The systems in a hybrid cloud environment include a computing cloud environment and data centers. The computing cloud environment includes virtual desktops, software and applications, servers, and storage for data. The information from cloud can be sent through an internet connection to individual users. Organizations use cloud computer to reduce costs, increase storage, and provide on demand availability for users across an increased geographic area. Organizations have to regulate the software which can be deployed across those systems to meet compliance requirements.

Most systems in a hybrid cloud have their own means of installing software. Account administrators must enact different means of controlling software installations across each target system, which provides high probability of drift as well as duplicates effort driving compliance. Drift occurs in data center and cloud environments when changes to software and hardware are made ad hoc and are not recorded or tracked in a comprehensive and systematic fashion. This can make it difficult for administrations to keep track of what software and applications may be on the servers, nodes, or end user computers in an organization. Not only could an outdated or wrong version of software be in the network but software and applications that are prohibited by compliance requirements could go undetected when human administrators are keeping track of all the software and applications in a system.

Currently there is no way to automatically load, manage, and delete the software that is hosted in an organizations catalog. Some systems keep a list of what applications are in the servers, clusters, nodes, individual computers, and other end user devices in a network. But there is no system that provides the means to centrally manage, from the cloud, the software and versions available for installation across hybrid and multi cloud environments.

The present disclosure addresses the deficiencies described above by providing a process (as well as a system, method, machine-readable medium, etc.) for creating and syndicating a central cloud management catalog across remote systems of a network. The process defines a private cloud, associates the private catalog with a target system, changes a format of the private catalog to the format of the target system, transfers the software in the private catalog to a target catalog, and removes a second set of software not in the private catalog from the target system.

Catalog as used herein is a data set that indicates the type, version, and other attributes of software in a system. In the central cloud catalog management system agents are used to transform the data and integrate with a systems' existing methods of software installation enforcement. An agent as referred to herein is a program that performs a task in the background. In some illustrative embodiments, the agent may act on a defined schedule. In other embodiments, the agent may respond to instructions from a user or changes in the system. The agent may be a software abstraction that is capable of acting with a certain degree of autonomy to perform a particular task on behalf of its host.

Illustrative embodiments include a private catalog that serves as the central catalog for the public cloud environment. The private catalog is a single source of truth (SSOT) for the network. A single source of truth as referred to herein serves as a single reference point of information in a company's data. Here, the private catalog will be syndicated to other regions or satellites in the cloud. Such as, for example, a public cloud can control and see other systems in the cloud network. The other systems may include open shift cluster, open-ended clusters. Each of these other systems has its own catalog making management of the software on these systems potentially difficult.

The private catalog also serves as the central software management realm, using standard cloud identity access management (IAM) authorization. Identity and access management (IAM) ensures that the correct users in an organization can access the tools needed to perform their user work. The correct users may refer to particular job roles in an organization. The correct users may also refer to users with a certain level of security clearance or experience in a job role. An IAM allows an organization to manage the applications a user can access without logging into each application as an administrator.

Illustrative embodiments include defining a private software catalog in a public cloud. The private software catalog includes a first set of software to be delivered to target catalogs in a target system. The first set of software may be defined by an administrator and may be based on industry regulations. In various industries, the software loaded and maintained in a network must be approved by regulations, administrators, or other entities that may be involved in the regulation of an industry. Defining the private software catalog may include adding an approved version of the software in the private software catalog. Defining the private software catalog may include adding an approved version of the software in the private software catalog.

The illustrative embodiments provide for management of software catalogs in hybrid and multi-cloud environment. A single source of truth (SSOT) is a single reference point for all the software in a cloud computing environment. Embodiments disclosed herein describe the network as a cloud computing or hybrid cloud computing environment; however, use of this example is not intended to be limiting but is instead used for descriptive purposes only.

Also, a "native" as referred to herein is software designed to run on a particular operating system. For example, when the first set of software is transformed and transferred to the target catalog and corresponding target system the users see the software as native and are unable to determine that the software came from another source.

Illustrative embodiments include associating the private software catalog with a target system. For example, on the IBM® Public Cloud, a private catalog is configured as a SSOT and can be used to update the existing catalogs on Redhat® OpenShift® clusters. (IBM and Redhat are trademarks owned by their respective owners in the United States and other countries). The IBM® Public Cloud uses the Operator Lifecycle Manager so that the cluster catalog only contains the software found in the IBM® Public Cloud private catalog. Operator Lifecycle Manager (OLM) helps users install, update, and manage the lifecycle of Kubernetes native applications (Operators) and the associated services running across their OpenShift® Container Platform clusters. Kubernetes as referred to herein are a set of nodes that run containerized programs. Containerizing applications package an application with its dependencies and some necessary services. Containerized applications are more lightweight and flexible than virtual machines.

As another example, the private catalog can serve as a single source of truth (SSOT) to specify which virtual server images (software) can be installed in virtual machines in a hybrid cloud environment. A virtual machine image is a single file which contains a virtual disk that has a bootable operating system installed on it.

As yet another example, a private catalog defined as a single source of truth can be syndicated to multiple cloud platforms such as by non-limiting example Azure®, Amazon Web Service®, and Google Cloud (Amazon Web Service, Azure, Google Cloud are trademarks owned by their respective owners in the United States and other countries) to control the software that can be installed in those environments.

Illustrative embodiments include transferring the first set of software within the private software catalog to a target catalog. The target catalog corresponds to a target system. Transferring may include syndicating the first set of software where the first set of software is distributed out from the public cloud to other systems in the network. Illustrative embodiments also include changing a format of the set of software in the private software catalog to match the target system. The format may be changed by a standard catalog transformation mode. Changing the format may include, by non-limiting example, using a JavaScript Object Notation (JSON), YALM, or other data interchangeable formats.

Illustrative embodiments also include transferring the first set of software within the private software catalog to a target catalog. The target catalog may correspond to the target system. In various embodiments, the target system may include a private cloud. In other embodiments, the target system may include virtual servers. Illustrative embodiments also include removing a second set of software from the target system. The second set of software may not be defined in the private software catalog for the target catalog corresponding to the target system. The second set of software may also be a version of the software that is no longer used. Illustrative embodiments as described herein do not keep a list of what software is in the target system. Instead, illustrative embodiments add software and delete software from the target system based on the information in the private catalog.

In illustrative embodiments, the private catalog may be updated to include different software. The embodiment may include adjusting a first set of software to include a new software. In some embodiments, the private catalog may be updated by users having permission to make such changes. The users may make changes by non-limiting examples through a user interface (UI). In other embodiments, the private catalog may be updated through a command-line interface (CLI). CLI is a text-based interface used to run programs, manage computer files and interact with a computer. CLI may also be called command-line user interfaces, console user interface, and character interfaces. In still other embodiments, the private catalog may be updated using a pipeline invoked through a CLI or application programing interface. A pipeline is a process that drives software development through a path of building, testing, and deploying code. The pipeline process is automated which helps to minimize human error and maintain a consistent process for how software is released.

Illustrative embodiments also include detecting and supporting a target system that is a disconnected environment.

Disconnected environment as referred to herein means the environment is not continuously connected to the public cloud. Illustrative embodiments also include transferring an install image and a set of resources to the target system. As previously described, an image is a type of software in virtual machines that is single file which contains a virtual disk that has a bootable operating system installed on it. Illustrative embodiments also include updating the first set of software in the target catalog corresponding to the target system to use the install image and the set of resources.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved cloud software management module 200 that provides control over what software and applications are utilized on individual computers. Cloud software management module 200 defines a private catalog in the public cloud 105. In various embodiments, the private catalog may be syndicated through the WAN 102 to remote servers 104. In other embodiments, the private catalog 204 may be syndicated or transferred through the WAN 102 to a private cloud 106 as illustrated. In addition to module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
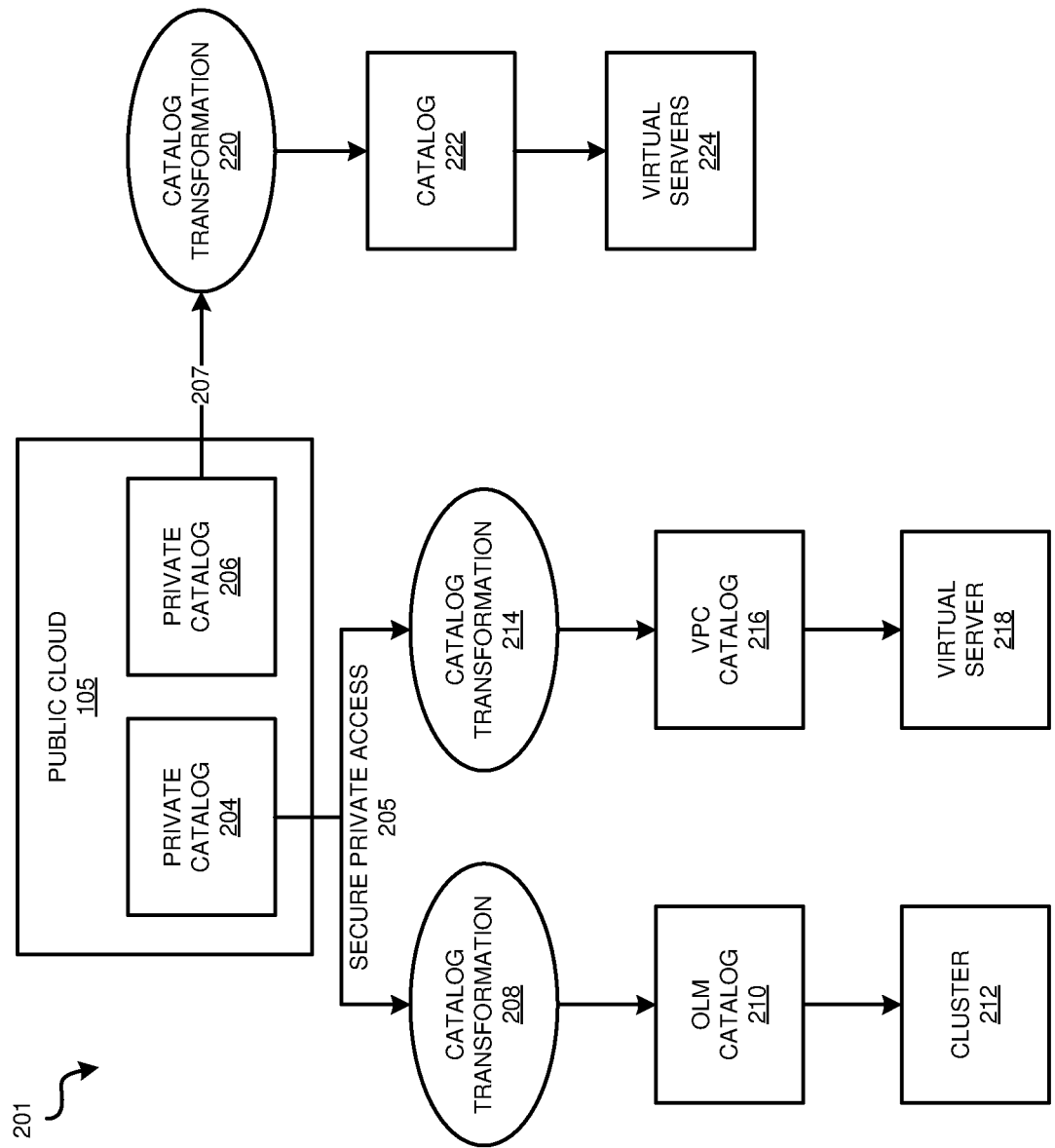
FIG. 2 depicts a block diagram of an overview example a cloud management system accordance with an illustrative embodiment.

With reference to FIG. 2, this figure depicts a block diagram of an example cloud software management module 201 in accordance with an illustrative embodiment. In the illustrated embodiment, the software management module 201 includes the public cloud 105 of FIG. 1. In the illustrated embodiment two private catalogs 204 and 206 are illustrated. The private catalogs are defined in a public cloud 105. The private catalog includes a first set of software. The private software catalog includes specifications of which versions of a software application can be installed on the satellite systems. In regulated environments, users of software may only be able to install a specific version or versions of a piece of software that have been approved for use. Other versions of the same software, including the latest version of the software, can be removed from the native software catalog.

The private catalog is associated with a target system such as the cluster 212. As illustrated, the private catalog data is pushed to the catalog transformation nodes 208 in the system through a secure private access route 205. Following catalog transformation 204, the first set of software in the private software catalog is transferred to the OLM catalog 210 corresponding to the cluster 212. Once at the cluster, the software in the first set of software can be distributed to the set of computers in the cluster.

In the illustrated embodiment, the private catalog 204 data can also be associated with a second target system. As illustrated here the second target system is virtual servers 218. In various embodiments, the virtual servers may be IBM® virtual servers (IBM is a registered trademark of International Business Machines of Armonk, New York). The format of the first set of software within the private software catalog 204 is then changed through catalog transformation 214 to match the format of software in the target virtual servers 218. Once the format of catalog has been transformed into the virtual private cloud catalog 216, the first set of software is transferred to the virtual servers 218. A second set of software on the virtual servers 218 may be removed because it is not defined in the first set of software from the private catalog. In this way, the system ensures that only approved software and applications are on the servers and computers in the system. The first set of software may be pushed onto computers and end user devices associated with the virtual server 218.

In the illustrated embodiment, a second private catalog 206 may be defined in the public cloud 105. The private catalog 206 is then associated 207 with the target system virtual servers 224. In various embodiments, the virtual servers may be Azure® virtual servers 224 (Azure is a registered trademark of Microsoft Corporation of Seattle, WA). The format of the private catalog is transformed to the language of the catalog 222 before being added to the virtual server. In various implementations, the format of the new catalog may be specific to the virtual server with which it is associated. Such as by non-limiting example, an Azure® catalog may be associated with Azure® virtual servers.

In some embodiments, the system prevents a user of the target system from installing a third set of software in the system where the third set of software was not originally defined in the private catalog. The target system may include a cluster, a virtual server, or any other system that connects computers to a public cloud. The method also includes requiring a user of the target system to only install the first set of software from the target catalog to the corresponding target system. In various embodiments, the first set of software can be adjusted to include a new software. The new software may be a new application or a new version of a previous application.

Figure 3:
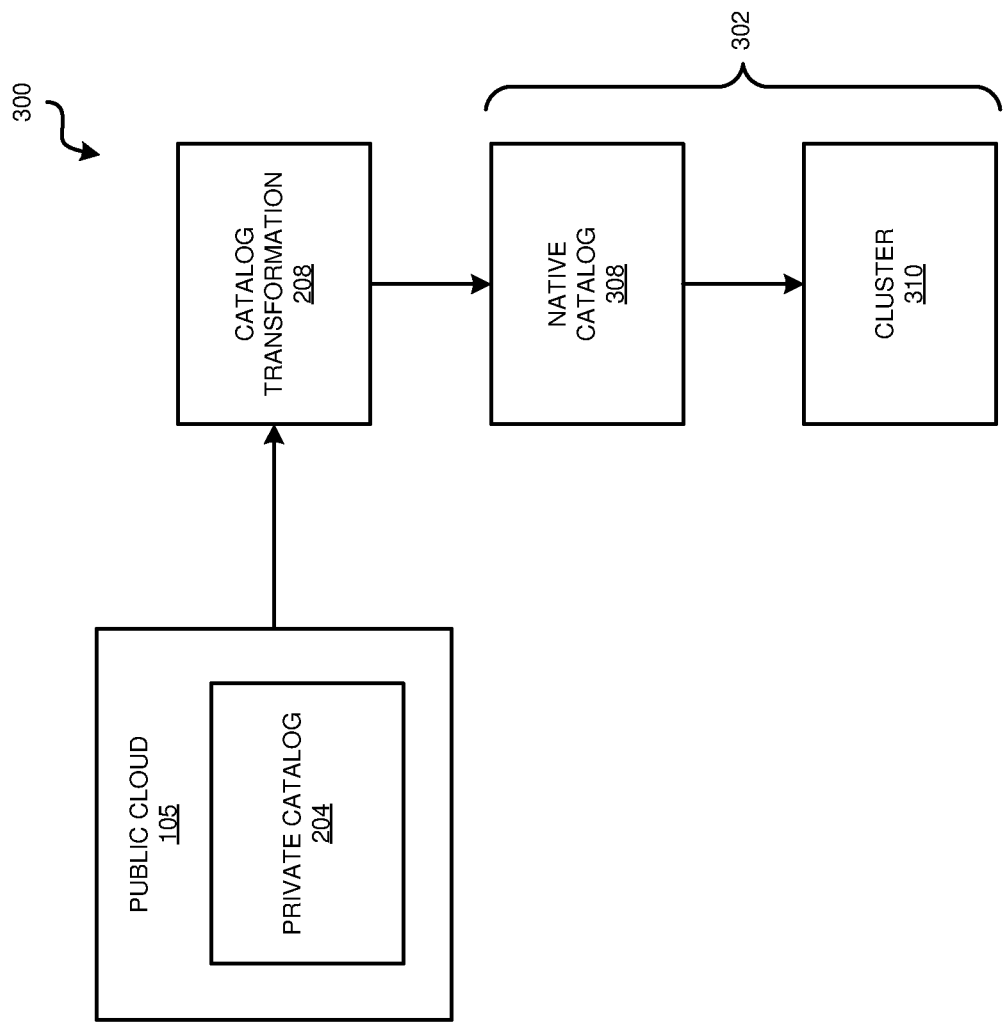
FIG. 3 depicts a block diagram of an example a cloud management system to a cluster in accordance with an illustrative embodiment.

With reference to FIG. 3, this figure depicts a block diagram of an exemplary system for managing software in a hybrid cloud environment 300 in accordance with an illustrative embodiment. In the illustrated embodiment, the public cloud 300 is an example of the public cloud 105 of FIG. 1.

In the illustrated embodiment, the system for managing software in a hybrid cloud environment 300 defines a private catalog 204 of software to be distributed to a target system 302. The target system 302 may include a computer cluster in various embodiments. The software is transformed into the transformation module 208 to match the format of the native catalog 308 of the cluster 310. The transformed software is pushed to the cluster 310 of the target system 302. When user accesses the transformed software, it appears to be native software meaning it was installed directly on the cluster or end user device. The end user cannot tell that the software came from the cloud.

Figure 4:
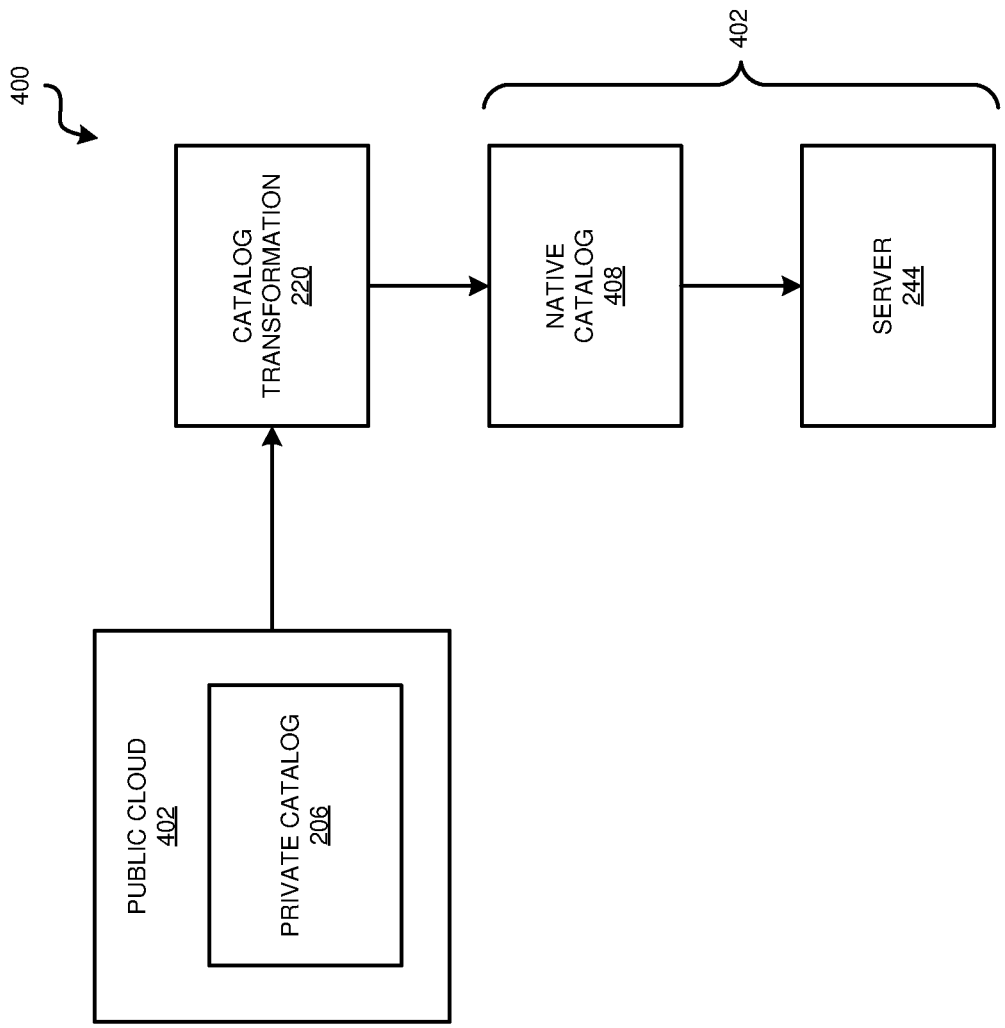
FIG. 4 depicts a block diagram of an example a cloud management system to a server in accordance with an illustrative embodiment.

With reference to FIG. 4, this figure depicts a block diagram of an exemplary system for managing software in a hybrid cloud environment 400 in accordance with an illustrative embodiment. In the illustrated embodiment, the public cloud 402 is an example of the public cloud 105 of FIG. 1.

In the illustrated embodiment, the system for managing software in a hybrid cloud environment 400 defines a private catalog 206 of software to be distributed to a target system 402. The private catalog corresponds to private catalog 206 in FIG. 2. The target system may include a server or a virtual server in various embodiments. The software is transformed in the transformation module 220 to match the format of the native catalog 408 of the target system 402. The transformation allows the software of the private catalog to become native to the target system. Once the software is native to the system end users cannot tell that the software came from the public cloud. The transformed software is syndicated to the server 244. Once on the target system, users of the system can determine which software to install on the end user devices connected with the server.

Figure 5:
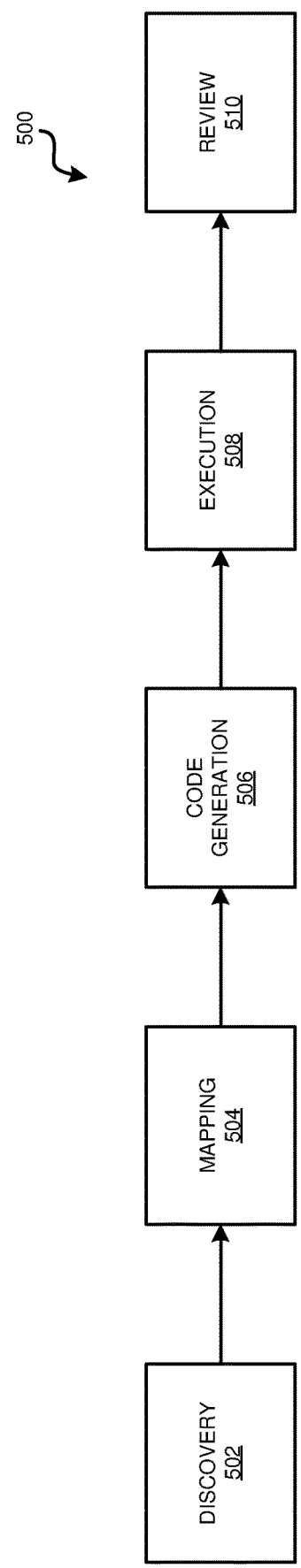
FIG. 5 depicts a block diagram of an example catalog transformation in accordance with an illustrative embodiment.

With reference to FIG. 5, this figure depicts an exemplary flow chart of catalog transformation in accordance with an illustrative embodiment. In the illustrated embodiment, the data transformation 500 is an example of the catalog transformation in FIG. 2. Referring to FIG. 2, the public cloud 105 initiates data transformation in order to format the first set of software of the private catalog for disparate systems. As referred herein, disparate systems are computer data processing systems designed to operate as distinct processing system without exchanging data or interacting with other computer data processing systems. By performing the data transformation, the public cloud can control what the software the target systems can have through a SSOT. This allows the automated management of software on the target systems to remain in compliance with regulatory agencies. The system is able to automatically transform the data in the private catalog and manage the remote systems that receive the data.

There are many ways to do data transformation; the example in FIG. 5 is used only as an example to explain possible steps of data transformation. The data transformation starts with discovery 502 where the format of the first set of software in the public cloud is determined. The next step includes mapping 504 or planning out how the data will be transformed from one format to another format. The next step 506 is code generation where the coding for first set of software in the private catalog is determined. The next step 508 is where the first set of software in the private catalog is written in the language of the new format. The last step of data transformation is to review 510 the newly transformed data to verify that the transformation was successful and the newly written format of the first set of the software is accurate in the new format native to the target system. While this is one method of data transformation for exemplary purposes, this is not intended to be limiting as any sort of data transformation known or unknown may be used to transform the software of the private catalog to the format of the target system catalog.

Hybrid cloud environments can contain a wide variety of systems to run different pieces of software. Organizations have to regulate the software which can be deployed across those systems to meet compliance requirements.

Before examples of this invention, most systems in a hybrid cloud had their own means of installing software. Account administrators must enact different means of controlling software installations across each target system, which provides high probability of drift as well as duplicates effort driving compliance.

This disclosure provides the means to centrally manage, from the cloud, the software and versions available for installation across hybrid/multi cloud environments. This central cloud catalog management is syndicated across the remote systems. In various implementations, a satellite system may be used (satellite definition below), where agent programs are used to transform the data and integrate with the systems' existing methods of software installation enforcement.

This central cloud catalog serves as source of truth, and the central software management realm, using standard cloud identity access management (IAM) authorization.

For example, on the IBM® Public Cloud, a private catalog is configured as a single source of truth and can be used to update the existing catalogs on Redhat® OpenShift® clusters, utilizing their Operator Lifecycle Management so that the cluster catalog only contains the software found in the IBM® Public Cloud private catalog.

As another example, the private catalog can serve as a single source of truth to specify which virtual server images (software) can be installed in virtual machines in a hybrid cloud environment.

As yet another example, a private catalog defined as a single source of truth can be syndicated to multiple cloud platforms such as, by non-limiting example, Azure®, Amazon Web Services (AWS)®, and Google Cloud to control the software that can be installed in those environments.

In addition to syndicating the specific software and versions from the IBM Public Cloud private catalog to a target system, any additional software images required by the syndicated software can also be copied to the target system during the transformation process, so that installations can be performed in a disconnected/air-gapped environment.

User defines a private catalog in the IBM® Cloud, containing software and their versions that are allowed for installation on one or more target systems. Each software product in the source catalog may contain one or more formats, which can be used on different target systems such as, by non-limiting example, OLM operators for OpenShift, helm chart for Kubernetes, and virtual server images.

The user associates the private catalog with one or more target systems and then enables syndication enforcement.

The private catalog is then continuously syndicated to the target systems, where the software is transferred into a format and enforcement controls to target system's software catalog. As an example of this transformation, for an OpenShift operator, an operator index is built and pushed into the user's private container registry. The index is then deployed on the OpenShift cluster, and OperatorHub is configured to use that index as its catalog source. In addition to adding approved software to the target systems software catalog, all other software found in the catalog, which is not found in the source of truth catalog, is removed as a part of the syndication process.

In addition, if the target system is located in a disconnected environment, during the catalog syndication and transformation process, any dependent images required to install a software product could also made available to the target system, and the software is updated to reference these images locally. This allows the software to be installed natively post syndication.

After the catalog has been syndicated, users of the target system are only able to install software that has been reflected on target system's catalog from the public cloud.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
defining, in a public cloud, a private software catalog, wherein the private software catalog comprises a first set of software, wherein the private software catalog is maintained in a first catalog format;
associating the private software catalog with a target system;
transforming, from the first catalog format to a second catalog format native to the target system, the first set of software within the private software catalog, the transforming generating a target catalog, the target catalog specifying that the first set of software is allowed to execute on the target system; and
transferring, to the target system, the target catalog, the transferring causing the target system to remove a second set of software from the target system, wherein the second set of software is not defined in the target catalog.

2. The computer-implemented method of claim 1, wherein the target system comprises a private cloud.

3. The computer-implemented method of claim 1, further comprising:
detecting the target system is a disconnected environment;
transferring an install image and a set of resources to the target system; and
updating the first set of software in the target catalog corresponding to the target system to use the install image and the set of resources.

4. The computer-implemented method of claim 1, the transferring further causing the target system to prevent a user of the target system from installing a third set of software not in the first set of software.

5. The computer-implemented method of claim 1, the transferring further causing the target system to require a user of the target system to only install the first set of software from the target catalog corresponding to the target system.

6. The computer-implemented method of claim 1, wherein defining the private software catalog comprises adding an approved version of the software in the private software catalog.

7. The computer-implemented method of claim 1, wherein defining the private software catalog comprises adding an approved format of the software in the private software catalog.

8. The computer-implemented method of claim 7, further comprising adjusting the first set of software to include a new software.

9. A computer program product comprising one or more computer readable storage media, and program instructions collectively stored on the one or more computer readable storage media, the program instructions executable by a processor to cause the processor to perform operations comprising:
defining, in a public cloud, a private software catalog, wherein the private software catalog comprises a first set of software, wherein the private software catalog is maintained in a first catalog format;
associating the private software catalog with a target system;
transforming, from the first catalog format to a second catalog format native to the target system, the first set of software within the private software catalog, the transforming generating a target catalog, the target catalog specifying that the first set of software is allowed to execute on the target system; and
transferring, to the target system, the target catalog, the transferring causing the target system to remove a second set of software from the target system, wherein the second set of software is not defined in the target catalog.

10. The computer program product of claim 9, wherein the stored program instructions are stored in a computer readable storage device in a data processing system, and wherein the stored program instructions are transferred over a network from a remote data processing system.

11. The computer program product of claim 9, wherein the target system comprises a private cloud.

12. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
  detecting the target system is a disconnected environment;
  transferring an install image and a set of resources to the target system; and
  adjusting the first set of software in the target catalog corresponding to the target system to use the install image and the set of resources.

13. The computer program product of claim 9, wherein defining the private software catalog comprises adding an approved version of the software in the private software catalog.

14. The computer program product of claim 13, further comprising changing a format of the first set of software in the private software catalog to match the target system.

15. The computer program product of claim 14, further comprising adjusting the first set of software to include new software.

16. A computer system comprising a processor and one or more computer readable storage media, and program instructions collectively stored on the one or more computer readable storage media, the program instructions executable by the processor to cause the processor to perform operations comprising:
  defining, in a public cloud, a private software catalog, wherein the private software catalog comprises a first set of software, wherein the private software catalog is maintained in a first catalog format;
  associating the private software catalog with a target system;
  transforming, from the first catalog format to a second catalog format native to the target system, the first set of software within the private software catalog, the transforming generating a target catalog, the target catalog specifying that the first set of software is allowed to execute on the target system; and
  transferring, to the target system, the target catalog, the transferring causing the target system to remove a second set of software from the target system, wherein the second set of software is not defined in the target catalog.

17. The computer system of claim 16, wherein the target system comprises a private cloud.

18. The computer system of claim 16, further comprising:
  detecting the target system is a disconnected environment;
  transferring an install image and a set of resources to the target system; and
  adjusting the first set of software in the target catalog corresponding to the target system to use the install image and the set of resources.

19. The computer system of claim 18, the transferring further causing the target system to prevent a user of the target system from installing a third set of software not in the first set of software.

\* \* \* \* \*